UNITED STATES PATENT OFFICE.

ZDENKO H. SKRAUP, OF VIENNA, AUSTRIA.

MANUFACTURE OF ARTIFICIAL CHINOLINE.

SPECIFICATION forming part of Letters Patent No. 241,738, dated May 17, 1881.

Application filed June 5, 1880. (Specimens.)

*To all whom it may concern:*

Be it known that I, ZDENKO HANNS SKRAUP, doctor of philosophy and lecturer of chemistry in the University of Vienna, in the Empire of Austria, have invented a new and useful Improvement in the Manufacture of Artificial Chinoline, which improvement is fully set forth in the following specification.

My invention relates to a new product which is obtained by the action of a mixture of glycerine and sulphuric acid upon a mixture of nitro-benzole and aniline, and which I have termed "artificial chinoline."

In carrying out my invention I proceed as follows: Twenty-four parts, by weight, of nitro-benzole are intimately mixed with thirty-six parts, by weight, of aniline, and with one hundred and twenty parts, by weight, of glycerine of about 1.26 specific gravity. I then add one hundred parts, by weight, of concentrated sulphuric acid of about 1.848 specific gravity, and the mixture is kept well agitated until a clear solution has been arrived at. I then start the action by heating the above solution in an ordinary still or vessel provided with a condensing arrangement, which allows the condensed vapors to flow back into the still, and I take care to discontinue the heating as soon as the mixture begins to enter into violent ebullition. The reaction, energetic at first, quickly subsides, and requires renewed heating in order to be started afresh; but it ought never to be allowed to proceed violently. After continuing the heating from two hours to about two hours and a half, little or no nitro-benzole will be found in the mixture, and the operation may be considered at an end.

In order to separate the artificial chinoline thus formed, steam is first passed through the mixture until any remaining traces of unchanged nitro-benzole have been driven off; but this is difficult to accomplish. Caustic soda is then added in excess, whereby the artificial chinoline is liberated, and may be further separated and purified by distillation with steam or otherwise.

The product thus obtained is a colorless liquid, which, when exposed to the air, assumes a redish-brown color. Its properties are substantially the same as those of the material found in coal-tar and known by the term "chinoline"; but the essential difference between my new product and the product known by the term "chinoline" is that the boiling-point of my product is constant at 236.7° to 237.7° centigrade, while the boiling-point of the chinoline heretofore known varies between 236° to 243° centigrade, owing to the presence of various other substances.

What I claim is—

1. As a new article of manufacture, an artificial chinoline having the characteristics herein specified.

2. The within-described process for the production of artificial chinoline by the action of glycerine and sulphuric acid upon a mixture of nitro-benzole and aniline, substantially in the manner above described.

In testimony whereof I have hereunto set my hand in the presence of two subscribing witnesses.

ZDENKO HANNS SKRAUP.

Witnesses:
G. SIEGLE,
A. BAEYER.